(No Model.)
A. A. BOYD.
DRAFT ATTACHMENT FOR HAMES.
No. 463,029. Patented Nov. 10, 1891.
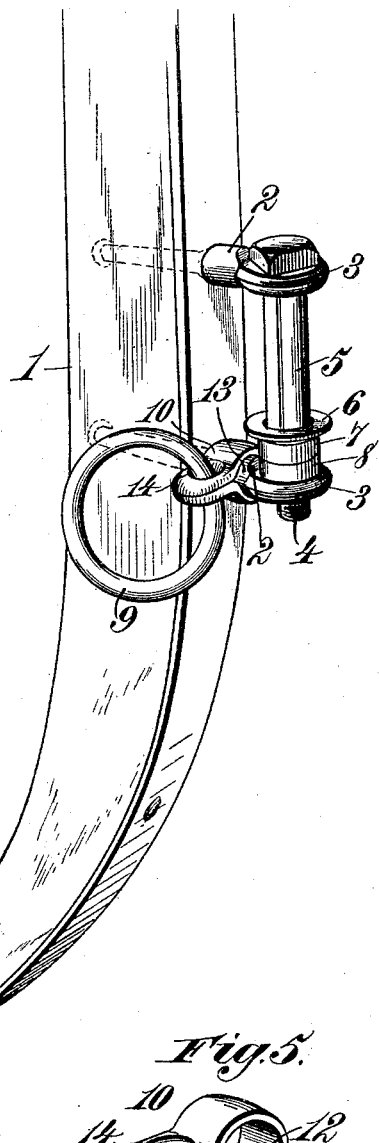
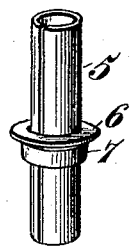
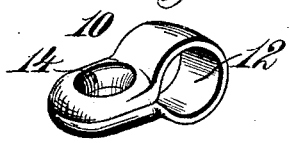
Witnesses:
Robert Everett,
J. A. Rutherford.
Inventor:
Arthur A. Boyd.
By James L. Norris,
Atty.

UNITED STATES PATENT OFFICE.

ARTHUR A. BOYD, OF AUBURN, NEW YORK.

DRAFT ATTACHMENT FOR HAMES.

SPECIFICATION forming part of Letters Patent No. 463,029, dated November 10, 1891.

Application filed July 11, 1891. Serial No. 399,220. (No model.)

*To all whom it may concern:*

Be it known that I, ARTHUR A. BOYD, a citizen of the United States, residing at Auburn, in the county of Cayuga and State of New York, have invented new and useful Improvements in Draft Attachments for Hames, of which the following is a specification.

This invention relates to that type of draft attachments for hames wherein a pair of horizontal studs or pins are secured to each hame-section and carry a draft-bolt on which is arranged a loose draft-sleeve provided with a rigid washer to retain the tug or trace from chafing contact with the lower stud or pin.

The objects of my invention are to provide a novel, simple, and economical draft attachment and to provide novel means whereby the washer can freely rotate on and independent of the sleeve for the purpose of more effectually protecting the lower edge of the tug or trace from wear which would arise from the movements of the animal.

The invention also has for its object to provide novel means for adjusting the washer vertically on the sleeve for the purpose of rendering the attachment susceptible of fitting tugs or traces of different widths.

The invention also has for its object to provide a novel, simple, and economical connection between the pole-ring and one of the studs or pins of the draft attachment.

To accomplish all these objects my invention involves the features of construction and the combination or arrangement of devices hereinafter described and claimed, reference being made to the accompanying drawings, in which—

Figure 1 is a perspective view showing my invention applied to a hame-section. Fig. 2 is a detail perspective view of the draft-sleeve, showing the adjustable washer or collar thereupon. Fig. 3 is a sectional view of the adjustable washer or collar. Fig. 4 is a similar view of the washer or collar adjusting ring, and Fig. 5 is a perspective view of the improved clip for connecting the pole-ring with one of the horizontal studs or pins.

In order to enable those skilled in the art to make and use my invention, I will now describe the same in detail, referring to the drawings, wherein—

The numeral 1 indicates a hame-section, and 2 the upper and lower horizontal studs or pins, which are attached at one extremity to the hame-section in any suitable manner and at the opposite extremity are provided with eyes or bearings 3 for the passage of the draft-bolt 4. The draft-bolt extends loosely through the uppermost stud or pin and preferably is screwed at its lower end into the eye or bearing of the lowermost stud or pin. The loose draft-sleeve 5 is arranged upon the draft-bolt between the eyes or bearings of the studs or pins, and this draft-sleeve can be made from a plate of flexible or sheet metal properly bent into tubular form until its longitudinal edges meet or nearly meet, and on the draft-sleeve is loosely arranged a washer or collar 6, having a tubular neck 7 in such manner that when the washer or collar is in position its uppermost supporting-surface is elevated a sufficient distance above the lowermost stud or pin 2 to retain the tug or trace from wearing or chafing contact with such lower stud or pin. The washer or collar is free to rotate upon and independent of the draft-sleeve 5, and therefore such washer or collar will partake of the movements of the tug or trace, even though the draft-sleeve remain stationary. This construction more effectually protects the lower edge of the tug or trace from wearing or chafing than the prior construction where a washer is cast or formed integral with the draft-sleeve.

The washer or collar is adapted to be raised and lowered upon the draft-sleeve in order to adjust it to tugs or traces of varying width, and to properly retain the washer or collar when adjusted upwardly on the draft-sleeve 5 I provide an adjusting-ring 8, which can be placed upon the draft-sleeve at a point beneath the washer or collar, so that such ring will elevate the latter and constitute a supporting-bearing on which the washer or collar can freely rotate to fulfill the conditions required. The adjusting-ring 8 is cylindrical, and may be of any suitable height; but if greater upward adjustment of the washer or collar is required, more than one adjusting-ring 8 can be placed upon the draft-sleeve beneath the washer or collar.

The formation of the washer or collar with a contracted tubular neck 7 enables me to provide a broad top bearing-surface without the employment of an undue quantity of metal.

By constructing the washer or collar of an independent piece adapted to freely rotate upon and independent of the draft-sleeve 5 I not only protect the tug or trace more effectually from wearing or chafing, but I also render the draft-sleeve susceptible of being made from a flat strip of flexible or sheet metal bent into tubular form. This reduces the cost of manufacture and is an advantage over the prior devices where the draft-sleeve is cast integral with a rigid washer.

The pole-ring 9 is connected with the lowermost stud or pin 2 by means of a simple and inexpensive clip 10, which clip is composed of a strip of flexible metal doubled upon itself to form a cylindrical eye 12, which is loosely journaled upon the cylindrical portion 13 of the lower stud or pin 2. The extremities of the flexible metal strip are brought into contact with each other, so that the orifices, as at 14, in the extremities of the strip register with each other and serve to receive the divided pole-ring 9.

The clip 10, constructed as described, is simple, efficient, and economical, and when in position it can oscillate in a vertical plane to provide the requisite flexible connection between the pole-ring and the draft attachment of the hame.

The several parts are so constructed and adapted to be assembled for practical use that it is possible to manufacture them in the most economical manner, and the structure as a whole provides a very desirable and efficient draft attachment which fulfills all the conditions required to protect the lower edge of the tug or trace from wearing or chafing and also adapt the attachment to tugs or traces which may vary in width.

The peculiar construction of the clip enables it to be made of forged iron or steel, which cannot be done where the clip is composed of an undivided casting, as heretofore.

Having thus described my invention, what I claim is—

1. A draft attachment for hames, consisting of the upper and lower studs or pins, the draft-bolt, the draft-sleeve loose on the bolt, and the washer or collar loosely mounted upon the draft-sleeve and adapted to freely rotate independent thereof, substantially as described.

2. A draft attachment for hames, consisting of the upper and lower studs or pins, the draft-bolt, the draft-sleeve carried by the bolt, the washer or collar loosely mounted on the sleeve and adapted to freely rotate independent of the same, and the loose adjusting-ring placed upon the sleeve beneath the washer or collar for elevating the latter to fit tugs or traces of varying widths, substantially as described.

3. A draft attachment for hames, consisting of the upper and lower studs or pins, the draft-bolt, the draft-sleeve on the bolt, the adjustable washer or collar mounted on the sleeve and adapted to freely rotate independent thereof, and the pole-ring clip consisting of a strip of metal doubled upon itself to form a cylindrical eye and having its extremities brought into contact and perforated for the passage of the pole-ring, substantially as described.

In testimony whereof I have hereunto set my hand and affixed my seal in presence of two subscribing witnesses.

ARTHUR A. BOYD. [L. S.]

Witnesses:
L. R. ESMAY,
E. M. KINNE.